US007668193B2

(12) United States Patent
Lo Iacono

(10) Patent No.: US 7,668,193 B2
(45) Date of Patent: Feb. 23, 2010

(54) DATA PROCESSOR UNIT FOR HIGH-THROUGHPUT WIRELESS COMMUNICATIONS

(75) Inventor: Daniele Lo Iacono, Reggio Calabria (IT)

(73) Assignee: STMicroelectronics S.R.L., Agrate Brianza (MI) (IT)

( * ) Notice: Subject to any disclaimer, the term of this patent is extended or adjusted under 35 U.S.C. 154(b) by 762 days.

(21) Appl. No.: 11/219,358

(22) Filed: Sep. 2, 2005

(65) Prior Publication Data
US 2007/0053377 A1 Mar. 8, 2007

(51) Int. Cl.
*H04W 88/02* (2009.01)
(52) U.S. Cl. ..................................... 370/463
(58) Field of Classification Search ................. 370/463
See application file for complete search history.

(56) References Cited

U.S. PATENT DOCUMENTS

| 6,539,438 | B1 | 3/2003 | Ledzius et al. | |
|---|---|---|---|---|
| 2006/0120342 | A1* | 6/2006 | Christensen et al. | ........ 370/351 |
| 2008/0320221 | A1* | 12/2008 | Fujii | ......................... 711/114 |

FOREIGN PATENT DOCUMENTS

| GB | 2 395 306 A | 5/2004 |
|---|---|---|
| WO | 2004114128 A2 | 12/2004 |

OTHER PUBLICATIONS

Luecke, James and Jordan, Michael; Programmable Digital Receiver Architecture for High Data Rate and Multichannel Communications Applications; Interstate Electronic Corporation; IEEE 1990; pp. 1256-1260.

Chen, Chi-Kuang, Tseng, Po-Chih, Chang, Yung-Chi, and Chen, Liang-Gee; A Digital Signal Processor with Programmable Correlator Array Architecture for Third Generation Wireless CommunicationSystem; IEEE 2001; pp. 1110-1120.

(Continued)

*Primary Examiner*—Melvin Marcelo
(74) *Attorney, Agent, or Firm*—Lisa K. Jorgensen; Paul F. Rusyn; Graybeal Jackson LLP

(57) ABSTRACT

A data processor unit includes at least two operation-execution units, each one adapted to receive input data, perform a respective operation on the input data and outputting output data resulting after applying said operation; the data processor unit further includes: a data storage unit including at least two individually-accessible memory devices adapted to store data; a programmable controller adapted to be programmed so as to execute a selected program; a first data routing circuit arrangement adapted to receive data from the at least two memory devices, from the programmable controller and from a second data routing circuit arrangement, and for selectively routing selected ones among the received data to the input of the operation-execution units; the second data routing circuit arrangement is adapted to receive the output data outputted by the operation-execution units and to selectively route the output data to the at least two memory devices, to the programmable controller, and to the first data routing circuit arrangement. The programmable controller is operatively coupled to the at least two operation-execution units, to the first and second data routing circuit arrangements, and to the at least two memory devices for controlling the operation thereof.

25 Claims, 9 Drawing Sheets

OTHER PUBLICATIONS

Kumura, Takahiro, Ishii, Daiji, Ikekawa, Masao, Kuroda, Ichiro, Yoshida, Makoto; A Low-Power Programmable DSP Core Architecture for 3G Mobile Terminals; IEEE 2001; pp. 1017-1020.

Rajagopal, Sridhar, Rixner, Scott, Cavallaro, Joseph; A Programmable Baseband Processor Design for Software Defined Radios; IEEE 2002 pp. III-413-416.

Verbauwhede, Ingrid, Touriguian, Mihran, Gupta, Kumkum, Muwaft, Jumana, Yick, Karl, Fettwels, Gerhard; A Low Power DSP Engine for Wireless Communications; IEEE 1996, pp. 471-480.

European Search Report, European Application No. EP 06 11 9703, dated Jan. 11, 2007, 3 pages.

Braunes et al. (2004) "RECAST: An Evaluation Framework for Coarse-Grain Reconfigurable Architectures"; International Conference on Architecture of Computing Systems, Augsburg, Germany, Mar. 23-26, 2004 Proceedings, pp. 156-166.

Hong et al. (2005) "Domain specific reconfigurable processing core architecture for digital filtering applications"; Journal of VLSI Signal Processing Systems For Signal, Image, and Video Technology, Kluwer Academic Publishers, Netherlands; 40(2):239-259.

Lo Iaconoet al. (2005) "Serial block processing for multi-code WCDMA frequency domain equalization"; Wireless Communications and Network Conference, 2005 IEEE New Orleans, LA, Mar. 13-17, 2005, Piscataway, NJ, pp. 164-170.

Lo Iacono et al. (2006) "ASIP architecture for multi-standard wireless terminals"; 2006 Design Automation and Test in Europe (IEEE Cat. No. 06EX1285C), IEEE Piscataway, NJ, p. 6.

B. Middha et al., "A trimaran based framework for exploring the design space of VLIW ASIPs with coarse grain functional units," 15th International Symposium on System Synthesis, ISSS, Kyoto, Japan, Oct. 2-4, 2002, International Symposium on System Synthesis, ISSS, New York, NY,, Oct. 2, 2002, pp. 2-7.

F. Barat et al., "Reconfigurable instruction set processors: a survey," Proceedings, IEEE International Workshop on Rapid System Prototyping, 2000, pp. 168-173.

F. Barat et al., "Reconfigurable instruction set processors: an implementation platform for interactive multimedia applications," Conference Record of the 35th Asilomar Conference on Signals, Systems & Computers, Pacific Groove, CA, Nov. 4-7, 2001, Asilomar Conference on Signals, Systems & Computers, New York, NY, vol. 1 of 2, conf. 35, Nov. 4, 2001, pp. 481-485.

\* cited by examiner

US 7,668,193 B2

DATA PROCESSOR UNIT FOR HIGH-THROUGHPUT WIRELESS COMMUNICATIONS

TECHNICAL FIELD

Embodiments of the present invention relate generally to an architecture for a data processor specially adapted to the use in the field of wireless communications. In particular, embodiments of the present invention relate to processor architecture having a high processing speed as well as a good degree of flexibility.

BACKGROUND ART

Wireless communications have become extremely popular in these years. In particular, even if initially conceived for simply enabling voice communications, wireless communication systems are evolving toward the offering of multimedia services with high data-rate.

From this viewpoint, high speed processing is required in order to support wide-band communications.

Moreover, the trend in wireless communications is toward (mobile) terminals that are able to support multiple standards, such as for example the coexistence of the IEEE 802.11 standard (Wireless LAN or WLAN) and the Wideband CDMA (the standard adopted for 3G cellular networks, like UMTS networks), and emerging variation thereof.

In other words, it would be highly desirable that the processors exploited in devices used in the wireless communication systems have an architecture such as to be able to perform different algorithms, depending on the adopted standard: this would increase their flexibility.

In this context, it has been observed that known approaches such ASIC (acronym for Application Specific Integrated Circuit) and DSP (acronym for Digital Signal Processor) data processor circuits have a number of limitations.

In fact, each of above mentioned solutions satisfies only one among the high-speed processing and flexibility requirements.

The ASICs feature good performance in terms of throughput, but they consist of a dedicated hardware. Thus, they are not adapted to being modified for tracking the rapid modifications of the wireless communications technology. In particular, a new dedicated hardware, i.e. the existing ASIC has to be heavily modified or a new ASIC has to be designed whenever new, emerging requirements appears.

On the other side, even more recent DSPs, although they are highly flexible, they are designed for a general purpose use, and hence are still not capable to sustain the high data rates needed in wireless communications.

It should be noted that the trade-off between high-speed processing and flexibility also depends on the higher or lower level ("granularity") of the instructions which the processor is able to perform. In particular, the instructions having a "thick granularity" allow executing complex operations (e.g., Fast Fourier Transform—FFT) which are however specific of a certain application and hardly re-usable in different contexts, whereas the instructions having a "fine granularity", that allow executing ordinary, relatively low-level operations (e.g., additions and the like), are more flexible and re-usable in different contexts, but are not optimized for performing complex operations. In this context, an ASIC can be seen as a particular processor capable of performing a unique, fixed instruction, customized for the specific application the ASIC is designed for, thus limiting the possibility of being re-used for different applications; in other words, an ASIC is custom-designed in view of a well defined, specific application, and is optimized for that application only. On the contrary, a DSP is adapted to perform a large collection of general-purpose fine-granularity instructions, without being specifically optimized for performing any complex operation, so it is not adapted for wireless communication applications, due to the relatively low processing speed.

SUMMARY OF THE INVENTION

An embodiment of the present invention proposes a data processor unit, particularly albeit not limitatively adapted for wireless communication applications, that features a high processing speed and a good flexibility at the same time.

Particularly, an embodiment of the present invention proposes a data processor unit, including at least two operation-execution units, each one adapted to receive input data, perform a respective operation on the input data, and outputting output data resulting from said input data after applying said operation. The data processor unit further includes a data storage unit including at least two individually-accessible memory devices adapted to store data; a programmable controller adapted to be programmed so as to execute a selected program; a first data routing circuit arrangement adapted to receive data from the at least two memory devices, from the programmable controller and from a second data routing arrangement, and for selectively routing selected ones among the received data to the input of the operation-execution units, the second data routing circuit arrangement being adapted to receive the output data outputted by the operation-execution units and to selectively route the output data to the at least two memory devices, to the programmable controller, and to the first data routing arrangement. The programmable controller is operatively coupled to the at least two operation-execution units, to the first and second data routing circuit arrangements, and to the at least two memory devices for controlling the operation thereof.

BRIEF DESCRIPTION OF THE DRAWINGS

Features and advantages of the present invention will be made apparent by the following detailed description of some embodiments thereof, provided merely by way of non-limitative examples, description that will be conducted making reference to the annexed drawings, wherein.

DETAILED DESCRIPTION

Figure 1:
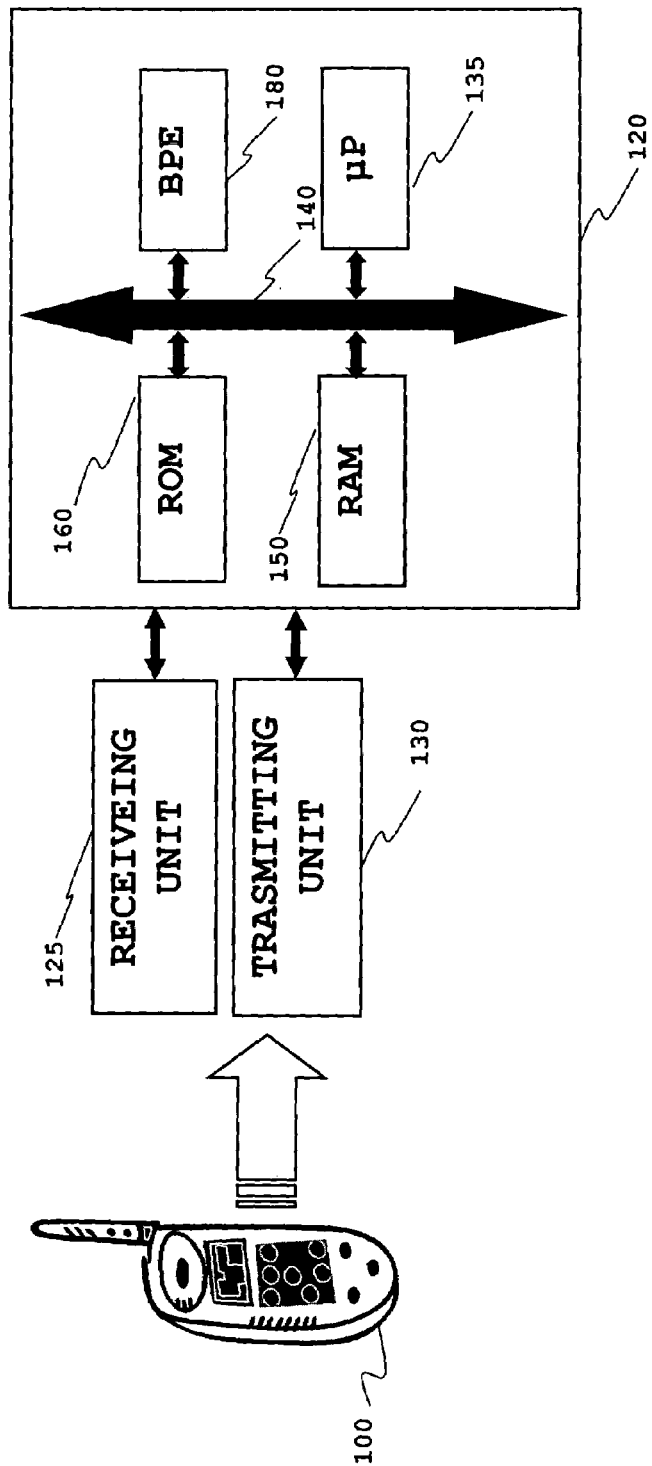
FIG. 1 shows schematically an exemplary scenario in which a data processor unit according to an embodiment of the present invention can be advantageously applied.

Referring to FIG. 1, an exemplary scenario considered is that of a mobile communications system, e.g., a mobile communications network such as, for example, a UMTS (Universal Mobile Telecommunications System) network, through which users equipped with suitable mobile communications terminals (or user equipments) 100 can communicate with each other, as well as with users of a Plain Old Telephone Network (POTN), exchange messages and, possibly, multimedia contents, and surf over the Internet according to an embodiment of the invention.

The internal circuit of the mobile terminal 100 includes a processing unit 120, that is used in conjunction with a receiving unit 125 and a transmission unit 130 for performing the digital base-band data processing required by the specific communication protocol. The receiving unit 125 and the transmission unit 130 schematically represent the radio-frequency subsystem of the mobile terminal 100. The processing unit 120 includes a microprocessor 135, being the system master, a system bus 140, a RAM memory 150, a ROM memory 160, and a data processor unit, hereinafter also referred to as a Block Processing Engine (BPE) 180. The designation as Block Processing Engine of the block 180 refers to the property of the BPE 180 of being able to process blocks of data; in particular, each block of data supplied to the BPE is formed by a sequence of complex elements (with a real and an imaginary part), and the generic block of data may be seen as a vector, whose elements are complex numbers, the vector having a 1×N size (that is with 1 column and N rows). In more detail, each element of the vector forming a data block may be a string of 32 bits having the least significant 16 bits representing the real part and the most significant 16 bits representing the imaginary part of the vector component; real numbers (i.e., numbers not having an imaginary part) may in this symbolism be represented by using only the 16 least significant bits, i.e. neglecting the most significant 16 bits in the string.

It should be noted that the capacity of the BPE 180 of managing and processing strings of bits representing complex numbers satisfies the requirements of the wireless communications processing. In fact, digital base-band processing for wireless communication systems makes use of complex numbers.

The BPE 180 is a programmable data processor unit, adapted to execute lists of instructions (on the whole forming a program), stored for example in a program memory. The capacity of the BPE 180 of managing vectors of data makes the program simpler and allows reducing the program memory size. More important, vectorial processing allows pipelining the processing of the different elements of the vectors, thus contributing to increase the processing speed.

Figure 2:
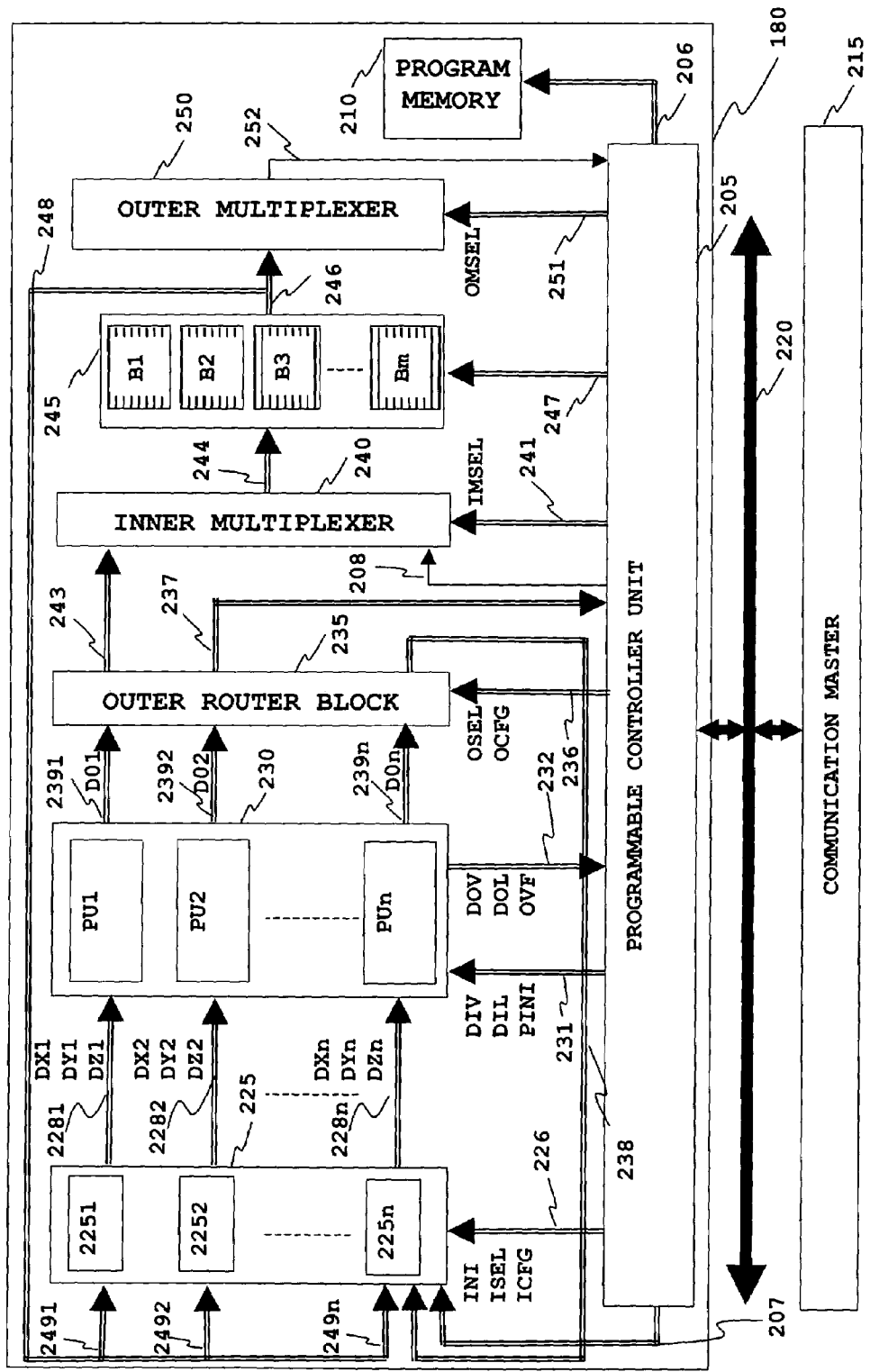
FIG. 2 shows a block diagram of a data processor unit according to an embodiment of the present invention, in terms of the main functional blocks.

FIG. 2 shows more in detail the architecture of the BPE 180, according to an embodiment of the present invention.

The BPE 180 includes a programmable controller unit 205, such as a microcontroller, which schedules the operation of the BPE 180. In use, the programmable controller unit 205 is adapted to interface with an external device 215 (in the following referred to as the Communication Master, CM) through a system bus 220; for example, the CM 215 may be the microprocessor 135 shown in FIG. 1, and the system bus 220 may be the system bus 140. The BPE 180 is adapted to operate as a slave in respect of the CM 215.

The programmable controller unit 205 is adapted to execute programs, including lists of instructions, storable in a program memory 210 provided in the BPE 180; the programs may be written by the user in an assembly-like programming language and are stored into the program memory 210.

A block 230 in the drawing is intended to represent a set of at least two (in the considered example, up to sixteen), operation-execution hardware units PU1, . . . , PUn, each one being a piece of hardware specifically designed so as to be adapted to efficiently execute at least one specific operation (e.g., an addition of two complex vectors, a multiplication thereof, an N-point Fourier transformation) on input data.

A block 245 in the drawing represents the storage unit (which hereinafter will be referred to as the data memories bank block), adapted to store data to be processed, e.g. data to be provided as inputs to the operation-execution units of the block 230, and/or data outputted by the operation-execution units of the block 230, and/or data received by the BPE 180 from the CM 215, and/or data to be provided to the CM 215, as will be described in greater detail later on.

The programmable controller unit 205 includes registers (described in greater detail later on) in which data, particularly scalar data, to be fed as inputs to the operation-execution units PU1, . . . , PUn, and/or scalar data outputted by the operation-execution units PU1, . . . , PUn can be stored. By scalar data there are meant data formed by a complex or a real number, as opposed to the above-defined complex vectors, which are instead formed by N elements each one being a complex number.

An inner router block 225 is provided at and connected to the input of the operation-execution units PU1, . . . , PUn. The inner router block 225 is controlled by the programmable controller unit 205. When an operation has to be executed by a specific operation-execution unit PUi (with i=1 . . . n) of the set 230, the programmable controller unit 205 causes the input data to be processed to be routed to that operation-execution unit PUi through the inner router block 225.

An outer router block 235 is further provided at and connected to the output of the operation-execution units PU1, . . . , PUn. The outer router block 235 is controlled by the programmable controller unit 205. After the generic operation-execution unit PUi has executed the desired operation on the input data, the programmable controller unit 205 causes the output data of that PUi to be routed to different destinations through the outer router block 235.

The destinations of the output data of the operation-execution units of the block 230 may be the data memories bank block 245, the registers of the programmable controller unit 205, or the operation-execution units themselves. The destination of the output data of a generic operation-execution unit PUi (produced as a result of a generic current operation) depends for example on the subsequent operation which has to be performed according to the program executed by the programmable controller unit 205. In fact, if in the subsequent operation the output data of the current operation have to be processed again by one of the operation-execution units of the block 230, the programmable controller unit 205 can cause the outer router block 235 to route the data available at the output of the operation-execution unit PUi directly to the proper operation-execution unit in the block 230 (with the help of the inner router block 225). On the contrary, if the data currently available at the output of the generic operation-execution unit PUi are not to be immediately processed in the subsequent operation according to the program, the programmable controller unit 205 causes the outer router block 235 to route the output data to the data memories bank block 245, so that the data are stored for subsequent use (the data may be successively outputted to the outside, or they may be provided as inputs to an operation-execution unit PU1, . . . , PUn at a later stage of the program).

More in detail, for managing the proper routing of the input data, the programmable controller unit 205 interfaces with the inner router block 225 and with the block 230 of the operation-execution units PU1, . . . , PUn through respective groups of signal lines 226 and 231.

Similarly to the PU block 230, which includes at least two, more generally a plurality of n operation-execution units PU1, . . . , PUn (e.g., sixteen, which is the maximum number of operation-execution unit PUi supported by the specific implementation of the programmable controller unit 205 herein considered by way of example), the inner router block 225 includes of at least two, in general a plurality of n inner routers 2251, . . . , 225n, each one uniquely associated to a corresponding operation-execution unit PU1, . . . , PUn.

The generic inner router 225i (with i=1 to n) is connected to the input of the respective operation-execution unit PUi by means of respective buses of data lines 2281, . . . , 228n; each of the buses of data lines 2281, . . . , 228n includes three sets of thirty-two-bit data lines; thus, the generic operation-execution unit PUi may receive, in the shown example, up to three input data, and thus it may be adapted to perform operations with up to three operands, each operand being a complex number represented, as described in the foregoing, by a string of thirty-two bits, in the exemplary embodiment herein considered.

More generally, the number of operands that may be processed by the generic operation-execution unit PUi may be equal to a number different, e.g. higher than three; in such a case, the inner router and the number of groups of signal lines from the inner router 225 to the PU block 230 should be adapted to support the feeding to the respective operation-execution unit PUi of the necessary number of operands.

In the exemplary case of three operands herein considered, each one of the three groups 2281, . . . , 228n of thirty-two bit data lines feeds to the input of the respective operation-execution unit a respective operand DXi, DYi and DZi.

After the execution of the desired operation, the generic operation-execution unit PUi sends output data DO1, . . . , DOn to the outer router block 235 through n groups 2391, . . . , 239n of, in the example herein considered, thirty-two bit data lines, each group being associated to a corresponding output of the operation-execution unit PUi.

As described above, the operation-execution unit output data DO1, . . . , DOn are routed by the outer router block 235 to different destinations. Particularly, the output data DO1, . . . , DOn may be sent to the programmable controller unit 205 (so as to be stored in the registers thereof); to this purpose, a plurality of n groups of, in this example, thirty-two bit data lines 237 are provided from the outer router block 235 to the programmable controller unit 205, one group of thirty-two bit data lines in respect of each operation-execution unit PU1, . . . , PUn. Alternatively, the output data DO1, . . . , DOn may be sent back to the input of the inner router block 225; to this purpose, a plurality of n groups of, in this example, thirty-two bit data lines 238 are provided from the outer router 235 to the input of the inner router block 225; in particular, the n groups of data lines 238 are fed to the input of every inner router 2251, . . . , 225n. In this way, depending on the subsequent operation to be executed, the inner router block 225 is adapted to route the output data of the generic operation-execution unit PU1, . . . , PUn to the input of one or more of the operation-execution units PU1, . . . , PUn. As a further alternative, the outer router block 235 is adapted to route the output data of the operation-execution units to the data memories bank block 245, so that the data can be stored therein. To this purpose, a plurality of groups of, in this example, thirty-two bit data lines 243 is provided, for sending the operation-execution unit output data to an inner multiplexer 240.

In particular, the data memories bank block 245 includes at least two, in general a plurality of m independently and concurrently-accessible memories B1, . . . , Bm, particularly Random Access Memory (RAM) and, even more particularly, Static RAM (SRAM). The plurality of groups of thirty-two bit data lines 243 includes in particular a number m of groups of thirty-two bit data lines, i.e. a number of groups of thirty-two bit data lines equal to the number of SRAMs. The inner multiplexer 240 is adapted to send the output data received from the outer router block 235 to the data memories bank block 245 through a plurality of m groups of thirty-two bit data lines 244. In this way, m output data from m operation-execution units may be stored in parallel into the m SRAMs of the data memories bank block 245.

The outputs of the m SRAMs of the data memories bank block 245 are fed to the inner router block 225; to this purpose, a plurality of m groups of, in this example, thirty-two bit data lines 248 is provided, connecting the outputs of all the concurrently-accessible memories (SRAMs) B1, . . . , Bm to the inputs of every inner router 2251, . . . , 225n. In this way, the generic operation-execution unit PU1, . . . , PUn may receive as input data a data word stored in any one of the m concurrently-accessible memories B1, . . . , Bm of the data memories bank block 245.

The data memories bank block 245 receives from the programmable controller unit 205 control signals including chip select signals, in respect of each SRAM of the bank, a write enable signal, enabling a writing or reading operation in one or more selected SRAMs, an output enable signal enabling the outputting of data by one or more of the SRAMs (in a further embodiment of the present invention, the output enable signal may be omitted), and address signals, for addressing the SRAMs; all these signals are in the drawing identified by reference numeral 247, for the sake of simplicity. In other words, the programmable controller unit 205 is adapted to generate all the necessary driving signals (in the drawing identified by reference numeral 247) for controlling the operation of the memories B1, . . . , Bm, depending on the type of the adopted memories.

The outputs of the m SRAMs of the data memories bank block 245 is also fed to an outer multiplexer 250, through a plurality of m groups of thirty-two bit data lines 246. The outer multiplexer 250, controlled by the programmable controller unit 205, is used for selecting the output of a desired one among the plurality of m SRAMs of the data memories bank block 245. The selection is performed by means of a control code OMSEL, that is sent to the outer multiplexer 250 by the programmable controller unit 205. Depending on the specific control code OMSEL, the selected memory output is transmitted to the programmable controller unit 205 through a thirty-two bit data line 252.

One of the functions of the inner multiplexer 240 and of the outer multiplexer 250 is to allow the programmable controller unit 205 to access in read/write any desired memory Bj (for j:1 ... m) of the concurrently-accessible memories of the data memories bank block 245, through an inner multiplexer control code IMSEL (controlling the inner multiplexer 240), the control code OMSEL and through the memories driving signals, in the drawing identified by reference numeral 247.

Returning to the architecture of the BPE 180, the programmable controller unit 205 communicates with the operation-execution units PU1, ..., PUn in the PU block 230 through control lines 231 (from the programmable controller unit 205 to the operation execution units PU1, ..., PUn) and 232 (from the operation execution units to the programmable controller unit).

Moreover, the outer router block 235, the inner multiplexer 240 and the outer multiplexer 250 are controlled by the programmable controller unit 205 through control lines 236, 241 and 251, respectively.

The program memory 210 interfaces with the programmable controller unit 205 through a group of signal lines 206 including a number of data lines equal to the dimension, in bits, of the generic instruction executable by the programmable controller unit 205. More in detail, the program memory 210 may be a SRAM, similar to the memories B1, ..., Bm of the data memories bank block 245; the programmable controller unit 205 may thus be adapted to drive the program memory 210 substantially in the same way as the data memories bank block 245.

Finally, the programmable controller unit 205 interfaces with each inner router 2251, ..., 225n through three groups of thirty-two bit data lines 207, so that the programmable controller unit 205 may provide to the generic one (or more) of the operation-execution units PU1, ..., PUn up to three operands.

During the operation of the BPE, the programmable controller unit 205 is adapted to configure each inner router 2251, ..., 225n, by means of configuration signals 226.

The configuration signals 226 include control lines adapted to carry two configuration words ISEL and ICFG, that are provided by the programmable controller unit 205 to all the inner routers 2251, ..., 225n, and a set INI of n distinct inner router selection code signals (one in respect of each inner router 2251), allowing the programmable controller unit 205 to address a specific one among the plurality of n inner routers 2251, ..., 225n.

The configuration words ISEL and ICFG depend on the number of operation-execution units PUi and on the number of input operands. The configuration words ISEL and ICFG are received by the specific inner router 225i (selected through the corresponding selection code INI); in such a way, it is possible to use a common, shared set of control lines for bringing the configuration words ISEL and ICFG to the generic inner router 2251, ..., 225n, instead of using distinct set of control lines for each inner router 2251, ..., 225n.

In particular, the configuration word ISEL selects the source of each input operand for the generic operation-execution unit (in fact each input operand may come from either the data memories bank block 245, through the m groups of thirty-two bit data lines 248, or from a register of the programmable control unit 205, through the three groups of thirty-two bit data lines 207, or from one of the operation-execution units PU1, ..., PUn through the group of thirty-two bit data lines 238).

The configuration word ICFG selects in turn the desired input operand(s) for the operation-execution unit among the plurality of input operands received from the source selected by the configuration word ISEL. For example, assuming that the selected source of one of the input operands is the data memories bank block 245, the configuration word ICFG allows selecting the operand among the available m data (i.e., which one memory among the memories of the data memories bank block 245 has to be used).

The programmable controller unit 205 is also adapted to initialize the operation-execution units PU1, ..., PUn. To this purpose, a plurality of n initialization words PINI (each one for a corresponding operation-execution unit PUi) is fed to the operation-execution units PU1, ..., PUn. The initialization word PINI is in particular used for selecting the operation-execution unit(s) involved in the operation(s) to be performed by the BPE, as specified by the current instruction in the sequence of the program; additionally, by the initialization word PINI the programmable controller unit 205 communicates to the operation-execution units PU1, ..., PUn the size N of the block of data to be processed. In an embodiment of the invention, before an operation is performed by the BPE, all the operation-execution units PU1, ..., PUn are disabled. When any one of the operation-execution units PU1, ..., PUn has to be invoked, the corresponding initialization word PINI provides for its activation. At the end of the operation, the invoked operation-execution unit PUi automatically disables, entering an "idle" mode, and is ready for a subsequent activation.

Moreover, the programmable controller unit 205 controls the operation of the PU block 230 by means of a plurality of n control signals DIV (acronym for Input Data Valid), one for each operation-execution unit, and a plurality of n control signals DIL (acronym for Last Data Valid) (part of the control lines 231), one for each operation-execution unit. The plurality of n control signals DIV and the plurality of n control signals DIL are used by the programmable controller unit 205 to control the supply of input data to the specific operation-execution units PU1, ..., PUn. In particular, the programmable controller unit 205 asserts one or more of the signals DIV for notifying the corresponding operation-execution unit(s) involved in the execution of an operation that the input data (coming from the data memory block 245, or from the registers of the programmable control unit 205, or from the output of another operation-execution unit PUt) are ready to be processed; corresponding ones among the plurality of n signals DIL are asserted by the programmable controller unit 205 for notifying that the currently fed input data is the last of an input data sequence (i.e. block). In such a way more operation-execution units PUi can be managed by the programmable-controller unit 205 at the same time, thus increasing the processing speed of the BPE.

Likewise, the generic operation-execution unit PU1, ..., PUn issues to the programmable controller unit 205 a respective control signal DOVi, part of a plurality of n signals DOV (acronym for Data Output Valid) shown in the drawing, and a respective control signal DOLi, part of another plurality of n control signals DOL (Data Output Last) (part of the control lines 232) shown in the drawing. The plurality of control signals DOV and DOL are used by the operation-execution units to manage the output data which flow from the operation-execution units PU1, ..., PUn. In particular, the generic operation-execution unit PU1, ..., PUn asserts the corresponding signal DOVi for notifying the programmable controller unit 205 that at the output thereof there are output data available; the signal DOLi is asserted for notifying the programmable controller unit 205 that the output data currently available at the output of the operation-execution unit are the last of an output data sequence.

The control signals 231 and 232 may include further signals in addition to the signals DIV, DIL, DOV and DIL; for example, the control signals 232 may include a plurality of overflow signals OVF which are asserted by each one invoked operation-execution unit PUi for notifying the programmable controller unit 205 that one or more overflows occurred during the execution of an operation. As described more in detail in the following, the programmable controller unit 205 may store the overflow indication (i.e., the number of overflows occurred during the execution of the operation) in a suitable register thereof. In an embodiment of the present invention, since the operation-execution units are adapted to execute operations on vectors of complex numbers, instead of simple overflow signals, the generic operation-execution unit provides to the programmable controller unit an overflow count value, indicative of the number of overflows possibly occurred during the execution of an operation on a vector of data.

The programmable controller unit 205 configures the outer router block 235 through configuration words OSEL and OCFG. More in detail, the configuration words OSEL and OCFG depend on the number of operation-execution units PUi. In particular, the configuration word OSEL selects whether the output of the outer router block 235 has to be routed to the data memories bank block 245, through the m groups of 32-bit data lines 243, or to the programmable controller unit 205, through the n groups of thirty-two bit data lines 237, or to the inner router block 225, through the n groups of thirty-two bit data lines 238. The configuration word OCFG selects which ones among the n output data available at the output of the operation-execution unit are to be taken (for example, for storing them into the selected SRAM of the data memories bank block 245).

The inner multiplexer 240 is controlled by the programmable controller unit 205 by means of the configuration word IMSEL, which allows selecting if, for the generic memory of the data memories bank block 245, the input data come from the outer router block 235 or from a register of the programmable controller unit 205, through thirty-two bit data lines 208.

The BPE 180 is able to execute a group (hereinafter, a bundle) of instructions concurrently.

The instructions executable by the BPE 180 can be classified into two types. A first type of instruction includes instructions, also referred to as Basic Instructions (BIs), which refer to operations that are internally executed by the programmable controller unit 205, without invoking the operation-execution units PU1, . . . , PUn. A second type of instructions, also referred to as Dedicated Instructions (DIs), includes instructions referring to operations that are not executed directly by the programmable controller unit 205, and for the execution of which the programmable controller unit 205 needs to invoke one of the operation-execution units PU1, . . . , PUn. In particular, as mentioned in the foregoing, at least one among the operation-execution unit PUi may be able to perform at least two dedicated operations, like for example a Fast Fourier transform, a Hadamard transform, and so on.

Unless otherwise specified, in the exemplary embodiment herein described all the BIs make use of 16-bit operands (expressing real numbers), thus when dealing with 32-bit registers, only the 16 least significant bits are used. In particular, the set of BIs may include instructions involving the execution of arithmetic operations instructions (for example, unsigned addition and signed subtraction), jumps in the program (for example, unconditional and conditional jump instructions), commonly used instructions (for example, a MOVE instruction, which is used for copying the content of a register of the programmable controller unit into another register thereof; a REGISTER PACK instruction, which is used for loading the content of two 16-bit registers of the programmable controller unit 205 into a 32-bit register thereof, so as to obtain a complex number starting from two real numbers) and memory instructions for managing the accesses to the SRAMs of the data memories bank block 245 (for example, memory lock and memory unlock instructions, that allow locking or unlocking respectively, a memory of the data memories bank block 245 to the communication master 215 in order to avoid possible conflicts due to simultaneous accesses to the memory).

In particular, by default all the memories of the data memories bank block 245 are locked when the programmable controller unit 205 starts the execution of the program. In such a way, any access to the data memories bank block 245 by the communication master 215 through the system bus 220 is inhibited. Before the end of the execution of the program, a memory unlock instruction may allow to unlock a sub-set of data memories of the memories bank block 245, so as to allow the communication master 215 to access any of them, for example for storing new data. Otherwise the data memories bank block remains locked and inaccessible for the communication master 215 for subsequent input/output operations.

Differently from the BIs, the DIs use 32-bit operands representing complex data (having the least significant 16 bits representing the real part and the most significant 16 bits representing the imaginary part).

The set of DIs may include instructions involving the execution of arithmetic and/or logic operations (for example, operations for obtaining the module of a complex number, or arithmetic operations on data represented by vectors of complex numbers); change of sign of relative numbers; fast transform operations (for example, Fast Fourier and Inverse Fast Fourier operations, Hadamard transform operations on data represented by vectors of complex numbers of different sizes); correlation operations and code-generation operations (for example, for generating UMTS scrambling and/or spreading codes).

DIs may be linked so as to form so-called macro-instructions, a macro-instruction including instructions which are intended to be executed in ordered succession, in a sort of pipeline, one after the other (the instructions of the macro-instruction are denoted as "linked instructions"), by different operation-execution units PU1, . . . , PUn. As described in more detail in the following, in the case of a sequence of linked instructions (or macro-instruction) when a register (denoted with reference numeral LXR in FIG. 3) of the programmable controller unit 205 is indicated within the current instruction as an output operand, the output data generated as a result of the execution of an operation by one of the operation-execution units PU1, . . . , PUn are directly passed as input operand(s) to another operation-execution unit PU1, . . . , PUn, which will have to execute the operation specified in the next, linked instruction; the register LXR will be in a similar way indicated as one of the input operands for the operation-execution unit that will have to execute the operation specified in the next linked instruction of the sequence. In other words, register LXR is adapted for being an indicator of the presence of at least one macro-instruction in the program stored in the program memory 210.

It is observed that, in an embodiment of the present invention, BIs cannot be linked to form a macro-instruction, and this allows keeping the inner structure of the programmable controller unit relatively simple; however, nothing prevents from designing the programmable controller unit in such a way as to be able to execute linked BIs as well.

The particular architecture of the block processing engine 180 makes it suitable for combining the dedicated instructions so as to perform a good variety of macro-instructions, thus allowing a great flexibility.

In a macro-instruction, the different linked instructions are executed by sending the data resulting from the execution of an operation by a generic one of the operation-execution units PU1, ..., PUn to one or more other operation-execution units PU1, ..., PUn; this is made possible by the peculiar architecture of the BPE 180, particularly, as described above, thanks to the outer router block 235, the n groups of thirty-two bit data lines 238, and the inner router block 225. During the execution of linked instructions, it is not necessary to save the output data generated by a generic operation-execution unit into the data memories bank block 245, and thus it is not necessary to retrieve the data from the memories bank block 245 for feeding them to the operation-execution unit that has to execute the next operation.

In this way, a lot of unnecessary accesses to the data memories bank block 245 are avoided, and the latency due to different linked instructions can be greatly reduced. Moreover, since each access to the data memories block 245 implies a power dissipation (especially in the case of SRAMs, which are fast but power-consuming memories), another advantage of the peculiar architecture of the BPE 180 is that, in case of linked instructions, it is possible to reduce the power consumption.

The capability of managing linked instructions as described above is particularly advantageous in wireless communications applications; in fact, in this case the data processing is typically performed creating a pipeline, a modality which is reproduced by the linked instructions.

BIs or DIs may also form bundles of instructions (and/or macro-instructions, in the case of DIs only, for the reason discussed above); in particular, according to the type of instructions, a bundle of BIs is denoted as a B-bundle, whereas a bundle of DIs is referred to as a D-bundle. In a D-bundle, the instructions and/or macro-instructions may be executed in parallel, i.e. concurrently to one another (the instructions in the bundle are denoted as concurrent instructions). In the program to be executed by the programmable controller and that is loaded into the program memory of the BPE, a suitable indicator (represented for example by a semicolon in the assembly-like language used for writing the program) identifies separation points between different instructions or macro-instructions which have be performed concurrently.

In particular, in a D-bundle, the instructions that may be executed concurrently operate on sets of independent data. For example, each DI of a D-bundle, that has to be executed concurrently to another DI of the bundle involves an operation that is executed by a corresponding operation-execution unit PU1, ..., PUn; the concurrent instructions can in other words be executed in parallel thanks to the fact that they rely, for their execution, on different operation-execution units, that can be activated in parallel. The higher the number of operation-execution units PUi in the PU block 230 that can be activated concurrently, i.e. the higher the number of the dedicated operations which may be performed at the same time, the higher the processing speed.

In the case of D-bundles, the time required for the execution of the instruction bundles is given by the longest execution time of the concurrent instructions (or macro-instructions) of the D-bundle.

It is to be observed that, according to the peculiar architecture of the BPE 180, the programmable controller unit 205 needs not to have knowledge of the internal structure and functioning of the operation-execution units PU1, ..., PUn, which may be considered as independent units, with theirs characteristic functions and operative modes, and with which the programmable controller unit 205 may colloquiate through suitable configurations words. In such a way, the block processing engine 180 introduces a significant "static" flexibility: the designer may in fact modify, e.g. upgrade the BPE, while retaining the same architecture, simply by substituting one or more operation-execution units with new one(s), compatible with the interface and communication protocol used by the programmable controller unit 205.

Figure 3:
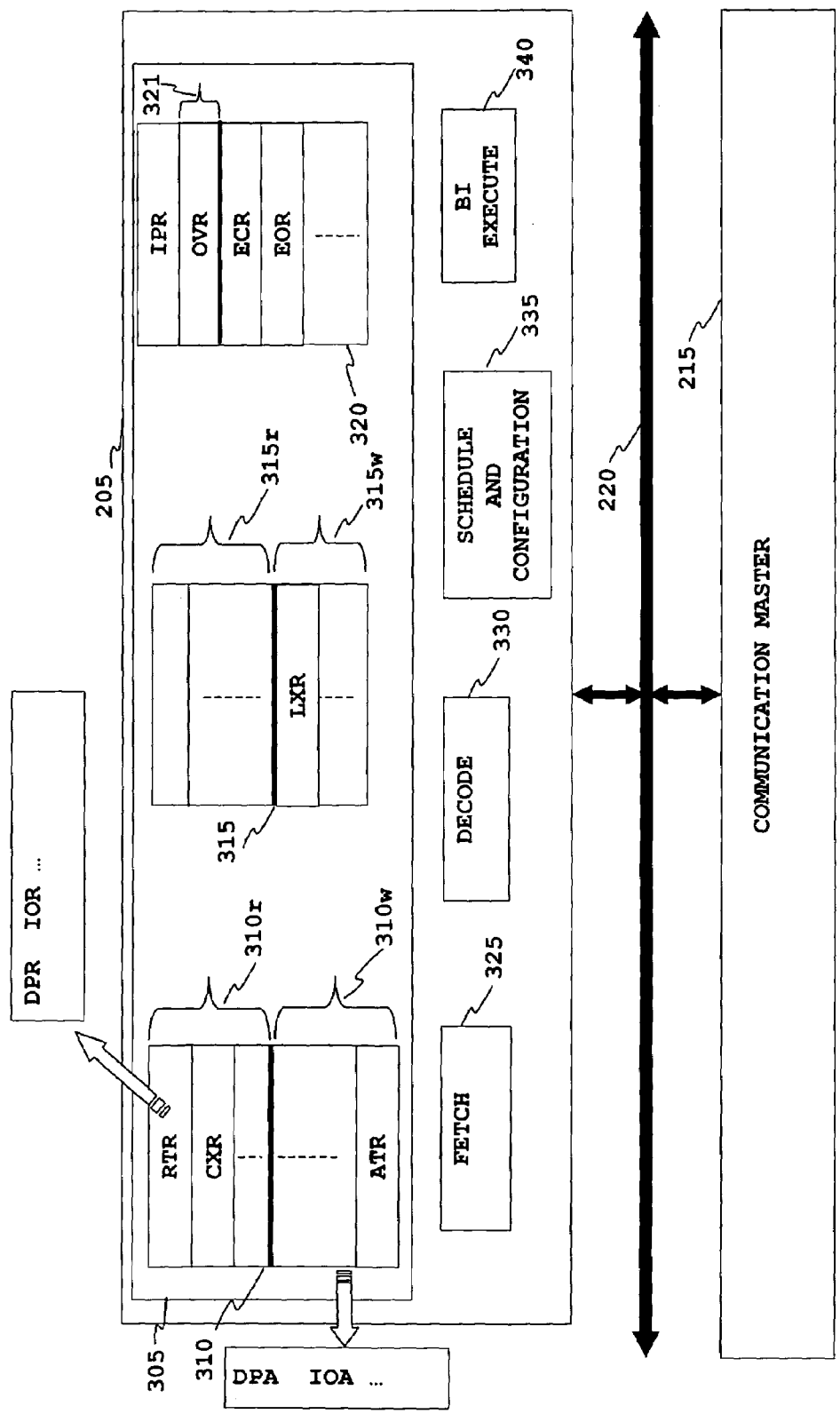
FIG. 3 shows in greater detail one of the functional blocks of the data processor unit of FIG. 2, namely a programmable controller unit of the data processor unit, according to an embodiment of the present invention.

Referring to FIG. 3, a more detailed, although still schematic, representation of the programmable controller unit 205 is shown according to an embodiment of the invention, in terms of some of the functional blocks relevant to the present description. The programmable controller unit 205 includes a register space 305 used for storing information used during the operation of the BPE. For example, the register space 305 includes registers adapted to store the data used during the execution of an operation. Moreover, the programmable controller unit 205 includes an instruction fetching unit 325, an instruction decoding unit 330 and a scheduling-configuration unit 335. The units 325, 330 and 335 are used by the programmable controller unit 205 for fetching the instructions from the program memory, according to the program, decoding the fetched instruction, and, based on the result of the decoding process, causing the scheduling or the execution of the operation(s) specified by the instruction. The programmable controller unit 205 also includes units, schematized in the drawing by a block 340, for directly executing operations corresponding to the BIs; depending on the result of the instruction decoding, the execution unit is capable of managing the invocation of one or more of the operation-execution units PU1, ..., PUn, in the case the instruction is a DI.

The register space 305 includes in particular a set of control registers 310, a set of data registers 315 and a set of internal registers 320. The set of control registers 310 and the set of data registers 315 are visible by the communication master 215, which can access them through write/read operations; on the contrary, the set of internal registers 320 are not visible, i.e. they are not directly accessible by the communication master 215.

In particular, the set of control registers 310 is used by the communication master 215 for controlling the operation of the (programmable controller unit of the) BPE, through the system bus 220. In particular, the set of control register 310 allows managing the communication between the communication master 215 and the programmable controller unit 205, performing input/output operations (such as addressing the program memory for downloading programs, transferring data to/from the memories of the data memories bank block 245, and the like).

For example, an operation which may be executed by the programmable controller unit 205 according to the requests coming from the communication master 215, is the switching of context between the execution of different programs, which are stored in the program memory; in this way, the BPE 180 is capable of performing the data processing in compliance for example to different communications standards, like the UMTS standard and the IEEE 802.11 (the standard of the Wireless LANs, or WiFi); the BPE 180 can thus be used in both UMTS cellular phones, and portable data processing apparatuses, like pocket PCs and similar, or in dual-mode terminals capable of communicating both over the UMTS network and over a WiFi network. For this purpose, the program memory may be logically divided in at least two memory banks, each memory bank being adapted to store a different program.

During the switching of context, the programmable controller unit 205 performs a set of operations adapted in particular to save the current context (so that it can be subsequently resumed), saving the content of the registers, for example into a dedicated portion of the program memory 210.

The set of control registers is divided in two control registers sub-sets: a read control register sub-set 310r and a write control register sub-set 310w. The registers belonging to the read control register sub-set 310r are accessible in read/write by the communication master 215, whereas they can only be read by the programmable controller unit 205. For example, the read control registers sub-set 310r includes a request table register RTR. The request table register RTR is a 5-bit register, each bit of which represents a field which is used for managing the communication between the communication master 215 and the programmable controller unit 205. In particular, the request table register RTR includes a field DPR that indicates a data processing request by the communication master 215, and a field IOR that indicates an input/output operation request by the communication master 215. The read control registers sub-set 310r further includes a context register CXR, which is used for holding the active context (i.e., "the number") of the program in execution.

The write control registers sub-set 310w can be considered as dual with respect to the read control registers sub-set 310r. The registers in the write control registers sub-set 310w can be read and written by the programmable controller unit 205, whereas they can only be read by the communication master 215.

The write control registers sub-set 310w includes in particular an acknowledge table register ATR. The register ATR is a 5-bit register and each bit thereof represents a field which is used for managing the communication between the communication master 215 and the programmable controller unit 205. In particular, a field DPA indicates a data processing acknowledge, and a field IOA indicates an input/output operation acknowledge.

Figure 4:
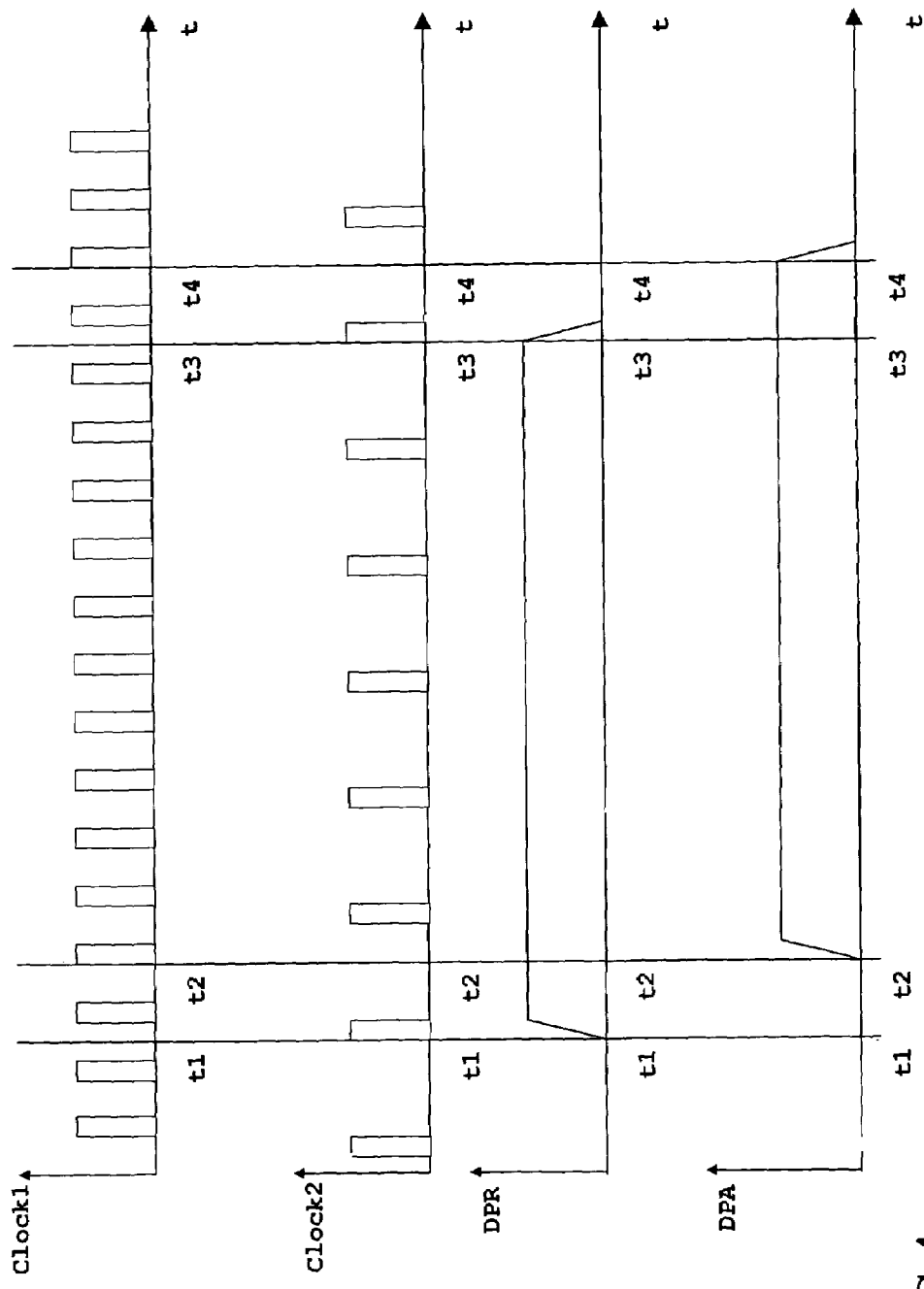
FIG. 4 shows an exemplary time diagram of a master/slave communication procedure between a communication master device and the data processor unit acting as a slave of the communication master, according to an embodiment of the present invention.

Referring to FIGS. 3 and 4 together, an exemplary asynchronous communication transaction according to adopted master/slave communication protocol for the communication between the communication master 215 and the programmable controller unit 205 is shown, in an exemplary case wherein the communication master and the BPE have independent time basis. In the drawing, clock signals Clock1 and Clock2 forms the system clock. In particular, the clock signal Clock1, having for example a frequency approximately ranging from 100 MHz to approximately to 200 MHz, clocks the programmable controller unit 205 of the BPE, and the clock signal Clock2, having for example a frequency approximately ranging from 20 MHz to approximately 100 MHz, clocks the communication master 215. At an instant t1, the communication master 215 accesses the register RTR and sets to "1" the field thereof corresponding to the desired operation, for example the field DPR for a data processing request. In response thereto, at an instant t2, the programmable control unit 205 asserts to "1" the corresponding field of the register ATR, for example the field DPA, for acknowledging the request from the communication master 215. Similarly, when at the instant t3 the communication master 215 resets the field of the register RTR, the programmable communication unit 205 acknowledges by resetting the corresponding field in the register ATR (at the instant t4). This corresponds to a handshake between the programmable controller unit 205 and the communication master 215.

Referring back to FIG. 3, the set of data registers 315 includes two data registers sub-sets: a read data registers sub-set 315r and a write data registers sub-set 315w. The registers belonging to the read data registers sub-set 315r are accessible in read/write by the communication master 215, whereas they are read-only registers for the programmable controller unit 205. The registers belonging to the read data registers sub-set 315r may be used within the program in execution as storage for scalar input operands of the operations to be performed. Operations to be executed by the operation-execution units PU1, . . . , PUn may get their input operands both from the content of these registers, and from the content of the data memories bank block 245.

The registers belonging to the write data registers sub-set 315w are accessible only in read by the communication master 215, whereas they can be read and written by the programmable controller unit 205; the registers belonging to the write data registers sub-set 315w can be used by the programmable controller unit 205 both as storage of scalar input operands for operations to be executed, and for saving the scalar output of executed operations.

The write data registers sub-set 315w includes in particular the linked execution register LXR, which is used by the programmable controller unit 205 for implementing the macro-instructions. As mentioned above, the linked execution register LXR is adapted for being an indicator of the presence of at least one macro-instruction. LXR will be indicated as an input operand into subsequent operation of the sequence of the linked instructions.

The set of internal registers 320 includes in particular registers whose content provides information useful for executing the instructions. For example, the internal registers 320 may include:

an instruction pointer register IPR storing a pointer to the current instruction of the program run by the programmable controller unit 205;

a register ECR storing a counter value indicative of the number of concurrent instructions/macro-instructions of a D-bundle; during the decoding of a fetched instruction, if the indicator of a linked (i.e., the register LXR) or concurrent (i.e., the semicolon operator) instruction is found the programmable controller unit 205 increases the content of the register ECR;

a register EOR storing an index of the operation-execution unit(s) PU1, . . . , PUn that has to be activated for performing the desired operation(s), whereby in case of linked instructions the content of the register EOR specifies an operation-execution unit activation sequence;

a sub-set of overflow registers OVR, adapted to store indications of overflow reported by the operation-execution units PU1, . . . , PUn in case an overflow occurs during the execution of operations; the overflow registers sub-set 321 may in particular include one overflow register for each operation-execution unit PU1, . . . , PUn of the PU block 230, which can be used by the corresponding operation-execution unit PU1, . . . , PUn to report status information (such as overflow information) to the corresponding overflow register of programmable controller unit 205 during the execution of the program.

The internal registers are not accessible by the communication master 215, neither in read nor in write, but they may be accessed using special instructions. For example, the registers of the overflow registers sub-set 321 may be accessed by the communication master 215 using a special instruction GET OVER FLOW REGISTER, used for storing into some of the controller registers 315w the content of the overflow registers for the different operation-execution units PU1, ..., PUn.

Some possible different way of operating of the BPE 180 will be now described.

Figure 5:
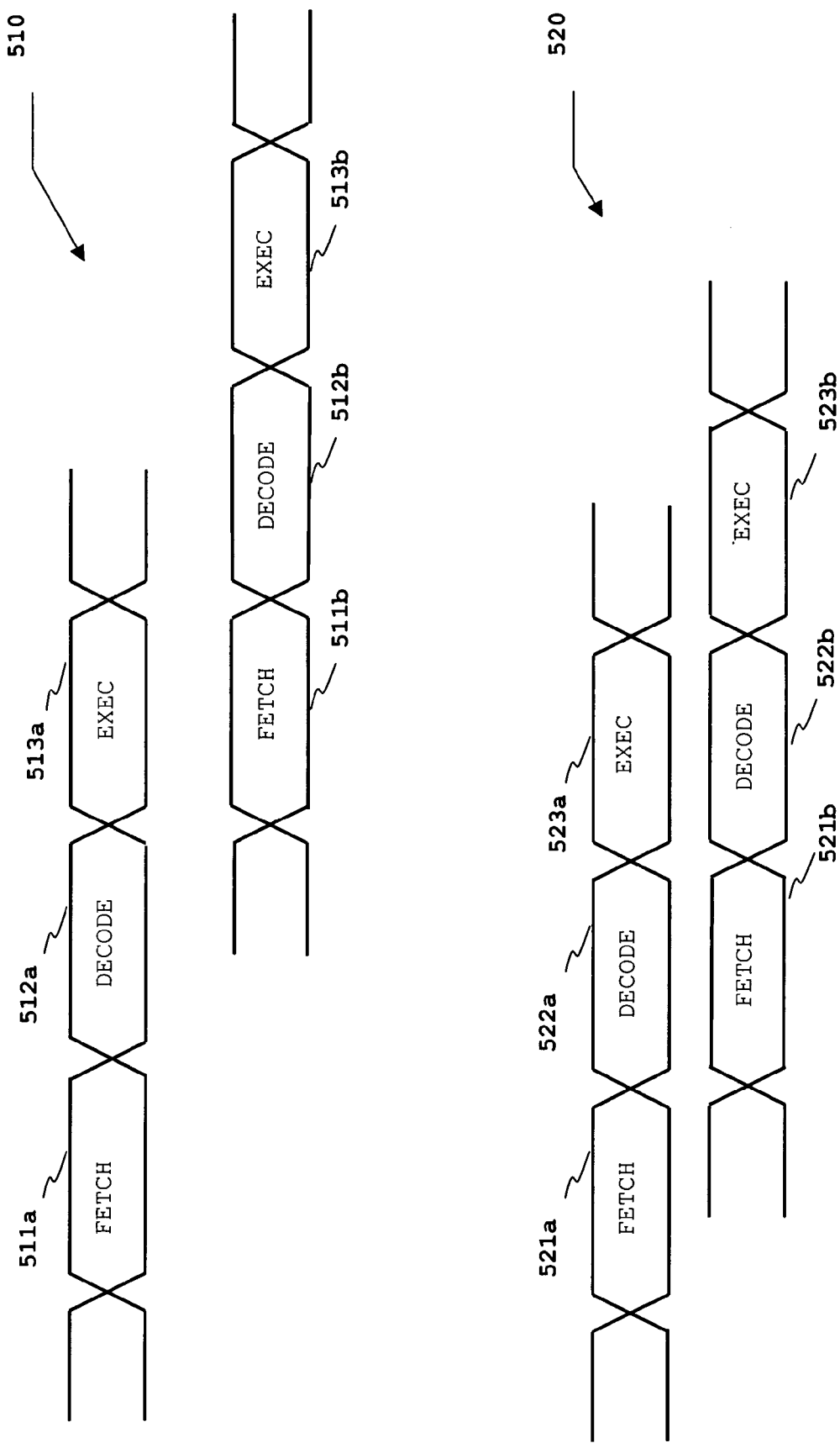
FIG. 5 shows a timing diagram of the operation of the data processor unit during the execution of a bundle of basic instructions, according to an embodiment of the present invention.

Referring to FIG. 5, a schematic timing diagram 510 pictorially shows the execution of a two generic BIs not forming a B-bundle (i.e., two dependent BIs); a timing diagram 520 pictorially shows the execution of two generic BIs that form a B-bundle.

Referring to time-diagram 510, in the execution of the program the programmable controller unit 205 fetches the next instruction (phase FETCH 511a). During the fetching phase 511a, the programmable controller unit 205 also ascertains if the instruction belongs to an instructions bundle (for example, this is done by the fetching block). In the negative case, after the fetching phase, the decoding unit 330 decodes the instruction (phase DECODE 512a), and the BI execute unit 340 causes the execution of the instruction (phase EXEC 513a). Simultaneously to the execution of the instruction (i.e., during the phase 513a), the fetch unit 325 fetches the next instruction in the program execution flow (phase FETCH 511b). Similar actions as described above are repeated for the newly fetched instruction (phase DECODE 512b, phase EXEC 513b). In other words, in the case just considered the current instruction and the subsequent instruction may be dependent one on the other, in the sense that the result of the operation(s) specified by the current instruction may be necessary to the subsequent instruction, for example the subsequent operation may have as input operand, the output operand of the current operation; thus, the decoding phase 512b of the subsequent instruction can not be performed until after the executing phase 513a of the current instruction.

In the case of a B-bundle, all the instructions are independent (as described above, in the embodiment of the invention herein considered, the BIs cannot be linked); the output of a generic current instruction of the B-bundle never forms an input operand for the subsequent instruction of the B-bundle.

In this case, referring to the timing diagram 520, considering a generic current instruction, the programmable controller unit 205 fetches the current instruction (phase FETCH 521a), then decodes the fetched instruction (phase DECODE 522a), and then causes the execution of the current instruction (phase EXEC 523a). The subsequent instruction is fetched (phase FETCH 521b) during the decoding of the current instruction.

It is observed that, in an embodiment of the present invention, the programmable controller unit 205 has resources adapted to support the internal execution of one basic instruction at a time, being not capable of directly executing more than one basic instruction concurrently. Thus, as shown in the timing diagram 520, the execution phase 523b is performed after the execution phase 523a. However, nothing prevents one from designing the programmable controller unit 205 in such a way as to be capable to internally execute two or even more instructions concurrently.

It can be appreciated that, by using B-bundles of instructions (where this is possible) two or more instructions can be pipelined, thus reducing the latency among the execution of different instructions of the same B-bundle. In fact, as shown in the time diagram 520, the fetching phase 521b of the subsequent instruction may be performed at the same time of the decoding phase 522a of the current instruction. This increases the processing speed (and thus the throughput of data) of the BPE 180.

Figure 6:
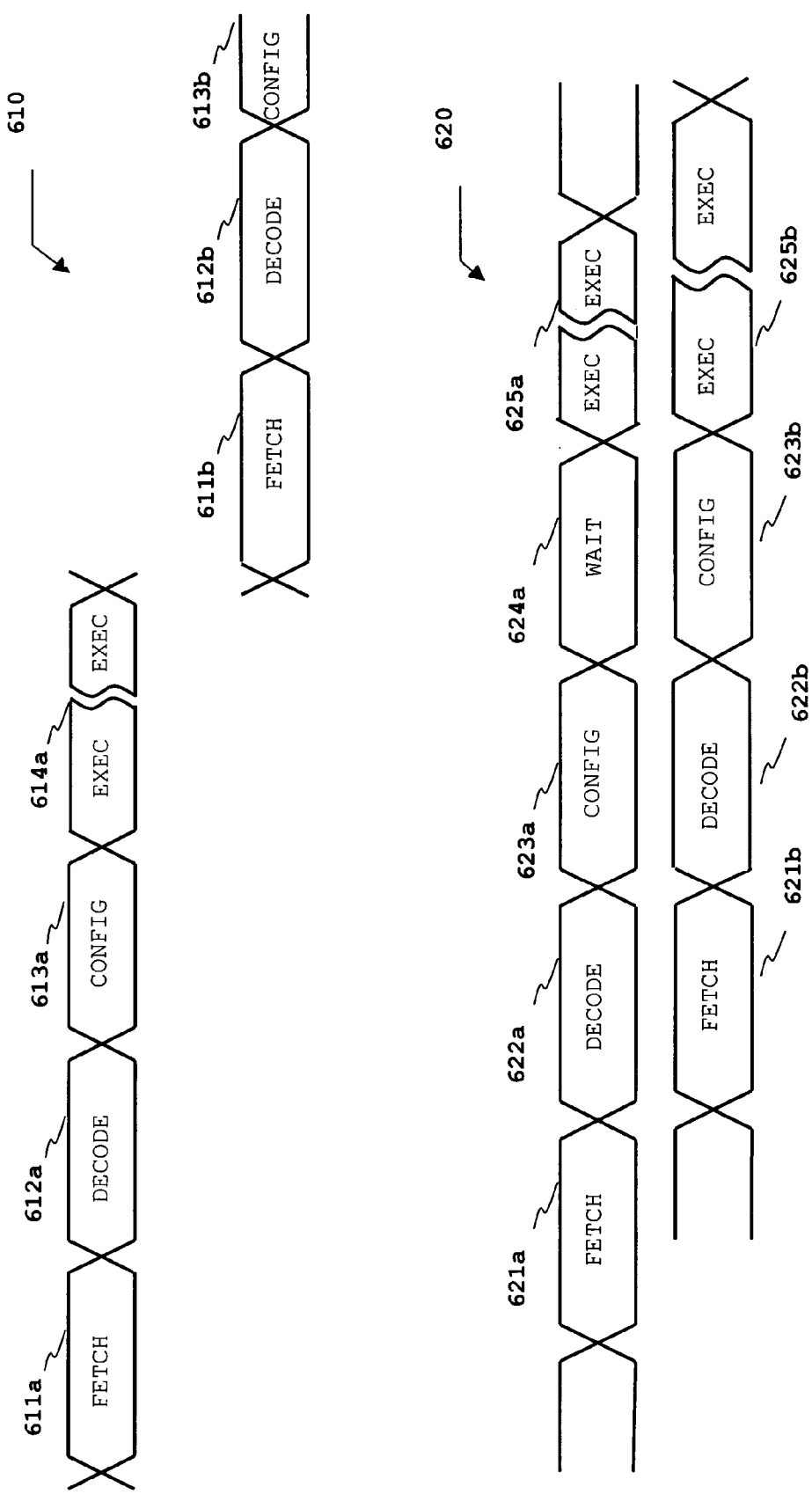
FIG. 6 shows a timing diagram of the operation of the data processor unit during the execution of a bundle of dedicated instructions, according to an embodiment of the present invention.

The timing diagrams of FIG. 6 refer to the execution of DIs, i.e. instructions that, for their execution, require the use of one operation-execution unit among the available operation-execution units PU1, ..., PUn. In general, a difference in the execution of DIs compared to BIs is that, after the decoding of the generic DI, the programmable controller unit 205 needs to perform a configuration of the operation-execution unit(s) that will have to execute the operation(s)-specified by the DI.

Referring to FIG. 6, a schematic timing diagram 610 pictorially shows the execution of a two generic DIs not forming a D-bundle; a timing diagram 620 pictorially shows the execution of two generic DIs that instead form a D-bundle.

Referring to time-diagram 610, in the execution of the program the programmable controller unit 205 fetches the next instruction (phase FETCH 611a). During the fetching phase 611a, the programmable controller unit 205 also ascertains if the instruction belongs to an instructions bundle (for example, this is done by the fetching block). In the negative case, after the fetching phase, the decoding unit 330 decodes the instruction (phase DECODE 612a), and the scheduling and configuration unit 335 of the programmable controller unit 205 configures the operation-execution unit that will have to execute the operation specified by the DI (phase CONFIG 613a). Successively, the operation-execution unit executes the instructions, i.e. it executes the operation(s) specified in the instruction (phase EXEC 614a). Similar actions as described above are repeated for the newly fetched instruction (phase FETCH 611b, phase DECODE 612b, phase CONFIG 613b), which is fetched only after the end of the execution phase 614a.

Referring now to the timing diagram 620, considering a generic current instruction, the programmable controller unit 205 fetches the current instruction (phase FETCH 621a), then decodes the fetched instruction (phase DECODE 622a), and then causes the configuration of the operation-execution unit(s) that will have to execute the operation(s) (phase CONFIG 623a). Before the execution of the instruction, the programmable controller unit 205 waits (phase WAIT 624a) until the fetching (phase FETCH 621b), the decoding (phase DECODE 622b) and the configuration (phase CONFIG 623b) of the subsequent instruction are ended. After the configuration, the execution of both the instructions is launched in parallel. Thus, by means of the waiting phase 624a, the execution of the two DIs (phase EXEC 625a and 625b) starts at the same time (the execution of one of the two DIs may in general take a different time compared to the other DI, depending on the latency); the execution-operation units that will have to execute the operations are activated in parallel.

In such a way, it is obtained a synchronization of the parallel execution of DI of a D-bundle.

Comparing the time diagrams 610 showing the processing of two single dedicated instructions to the time diagrams 620, it can be appreciated that the processing of DIs forming a D-bundle has a reduced overall latency, thus allowing an increased throughput. In fact, since the executing phase typically takes more time (i.e., more clock cycles) than the other phases (which may be performed during only one clock cycle), the concurrency of more executing phases allows for reducing the overall latency.

It is observed that in order to have a high overall BPE processing speed, not only is the number of operation-execution units is important: the operating frequency of the programmable controller unit should in fact be high enough not to represent the bottleneck in the execution of the instructions; in particular, there is a trade off between the number of operation-execution units and the operating speed of the programmable controller unit, due to the increase in complexity of the circuit. It has been found that the operating speed of the programmable controller unit 205 is still reasonably high (e.g., about 150 MHz) even when using a relative large number of operation-execution units (e.g., 16).

Figure 7:
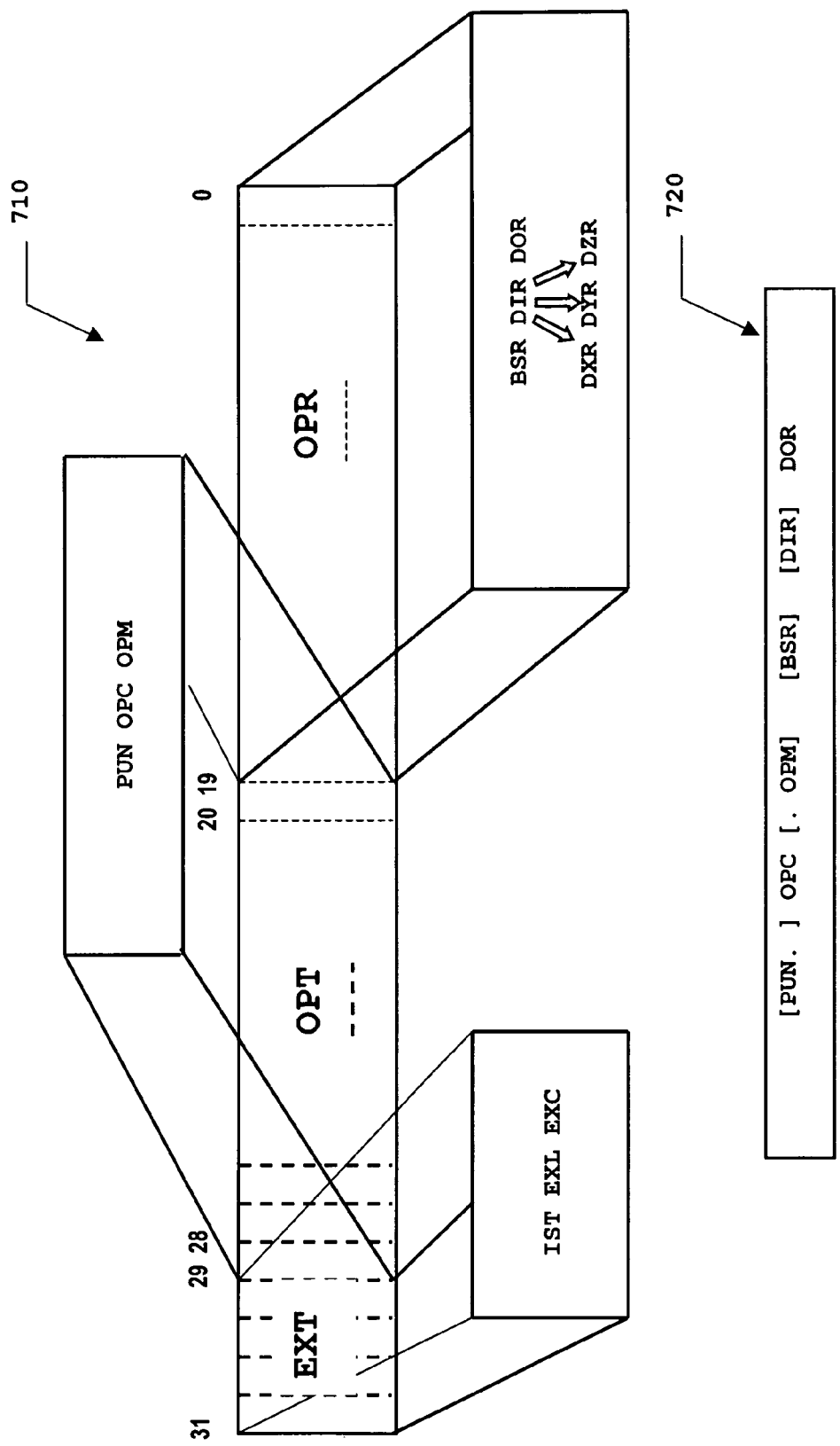
FIG. 7 shows the format of an instruction for the programmable controller unit of the data processor unit, according to an embodiment of the present invention.

Referring to FIG. 7, an exemplary instruction format 710 with a corresponding mnemonic representation 720 is schematically shown. The generic instruction 710 consists of 32 bits, grouped in fields.

A 3-bit field EXT (acronym for EXecution Type) is used to determining which type of execution has to be performed. The field EXT consists of groups (or sub-fields) IST (Instruction Type), EXL (EXecution Linked) and EXC (EXecution Concurrent) of one bit, each one used for a specific rule.

According to the configuration of the sub-fields IST, EXL and EXC, in particular, the sub-field IST specifies whether the instruction is a BI (i.e., executed directly by the programmable controller unit) or a DI (i.e., for the execution of which it is necessary to invoke one or more operation-execution units PU1, . . . , PUn). The sub-field EXL specifies whether the instruction is linked to the subsequent instruction (the output of the current instruction must be fed directly to the input of the next instruction). The sub-field EXC specifies whether the current instruction and the subsequent instruction are to be executed in parallel, i.e. they form a bundle of instructions.

An 9-bit field OPT (Operation Type) is used for determining which type of operation has to be performed. The field OPT depends on the type of instruction that has to be executed. For this purpose, the field OPT is divided in groups (in the following denoted by fields) of bits according to the type of instruction.

For BIs, the field OPT represents the entire operation code of the instruction itself.

For DIs, a 4-bit field PUN (PU Number) selects the operation-execution unit PU1, . . . , PUn which has to be used for performing the desired operation. In other words, the field PUN allows choosing which one among the, in the present example, sixteen dedicated operation-execution unit has to be involved in the processing. A field OPC specifies which one among the operations performed by the selected operation-execution unit has be used; for example, the field OPC may be of 3 bits, so as to support operation-execution units capable of performing one out of eight different operations. A 2-bit field OPM (Operation Mode) indicates the operating mode for each specific operation.

Finally, the remaining 20 bits of the instruction 710 form a field OPR (acronym for OPerands Registers) which is used to determine which are the registers holding the information needed to retrieve the input operands, as well as to determine the register holding the information about the address of the output operands.

Similarly to the field OPT, the field OPR consists of groups (or fields) of bits, each one used for a specific rule. For example, a 1-bit field BSR specifies the register storing the block size; a 15-bit field DIR includes the pointers to the registers holding the information needed to retrieve the N (up to 3, i.e. DXR, DYR and DZR in the present example) input operands for the operation-execution units; a 4-bit field DOR stores the pointer to the register holding the information needed to address the output operand.

Figure 8:
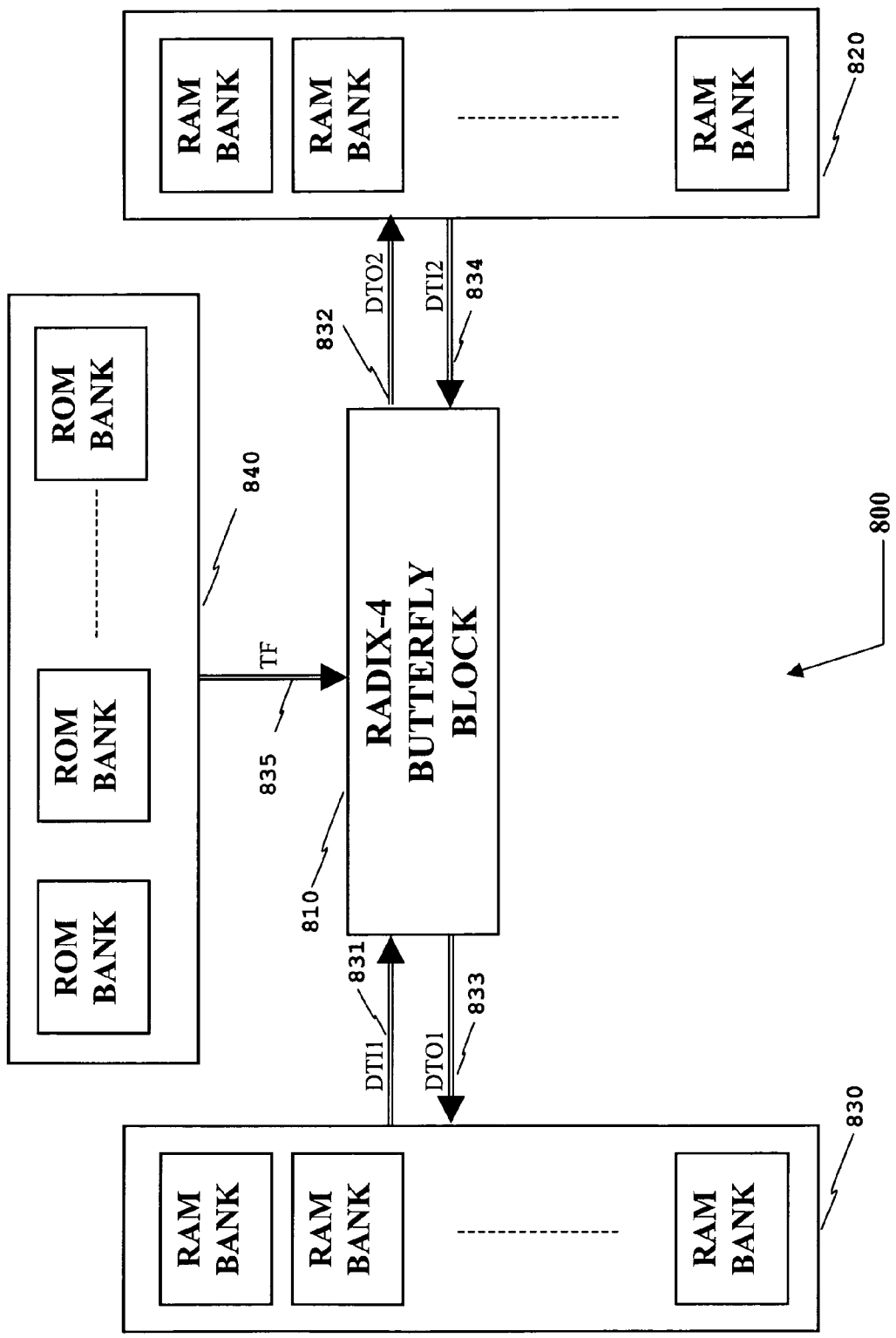
FIG. 8 shows, in terms of functional blocks, an exemplary basic architecture of an operation-execution hardware unit of the data processor unit of FIG. 2, adapted to execute a first set of dedicated operations under request of the programmable controller, according to an embodiment of the present invention.

Hereinafter, two exemplary operation-execution units that may be embedded in the BPE are presented. Referring to FIG. 8, a basic architecture of an operation-execution unit being a Fourier Transform Unit (FTU) 800 is schematically shown. The FTU 800 is capable of performing the Fast Fourier Transform (FFT) and the inverse FFT of blocks of data of different sizes.

The FTU 800 includes a single Radix-4 butterfly block 810, two RAM memory blocks 820 and 830 and a ROM memory block 840. The single Radix-4 butterfly block 810 is used to serially perform the FFT and the inverse FFT on the 32-bit complex input data DTI1 or DTI2 which are stored in the RAM memory blocks 830 or 820 using the twiddle factors TF which are stored into the ROM memory block 840. In particular, the thick arrow lines 831 and 834 represent the 4 groups of 32-bit complex input signal lines providing the input data DTI1 and DTI2, whereas the thick arrow lines 832 and 833 represent 4 groups of 32-bit complex output signal lines delivering the output data DTO1 and DTO2. The RAM memory blocks 820 and 830 and the ROM memory block 840 are preferably divided into banks, in order to reduce the processing time. In such a way, the 4 groups of 32-bit input data lines DTI1 or DTI2 are available in one clock cycle only for each Radix-4 butterfly calculation.

Moreover, the RAM memory blocks 820 and 830 are used for even and odd stages of the FFT calculation respectively.

After the calculation of the FFT or of the inverse FFT on the input data, the output data DTO1 or DTO2 are stored into the RAM memory blocks 830 or 820, thus being ready for the subsequent processing required by the wireless communication system.

Figure 9:
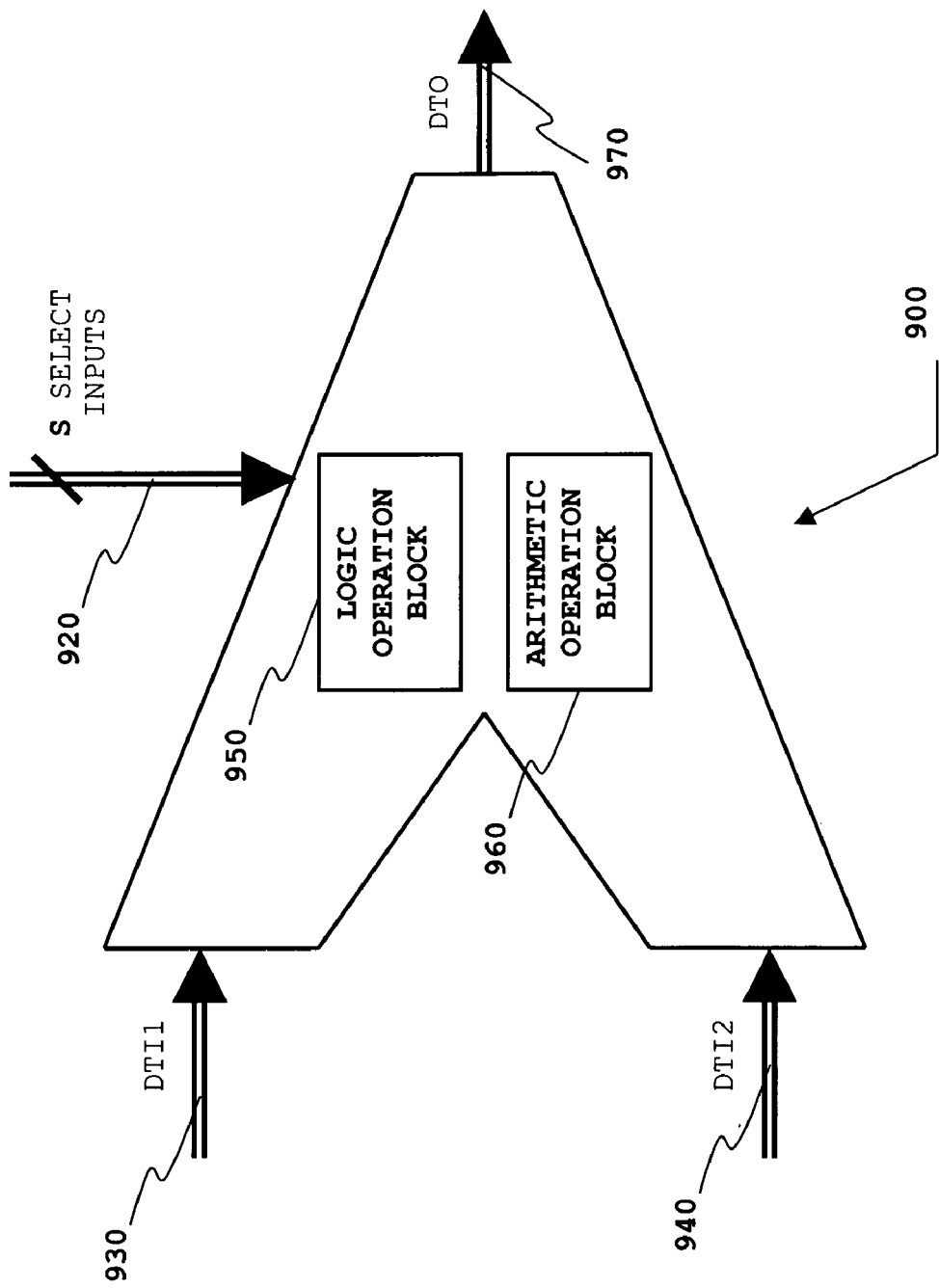
FIG. 9 shows, in terms of functional blocks, an exemplary basic architecture of another operation-execution unit of the data processor unit of FIG. 2 adapted to execute a second, different set of dedicated operations under request of the programmable controller, according to an embodiment of the present invention.

Referring to FIG. 9, a basic architecture of an Arithmetic Logic Unit (ALU) 900 is schematically shown. The ALU 900 is mainly used for performing arithmetic and logic operations on data represented by vectors of complex numbers. For example, the ALU 900 is able to add two binary-coded vectors, to compare two vectors, and the like. The ALU 900 performs one among these available operations, depending on the combination of select inputs 920, part of the initialization word provided by the programmable controller unit 205.

The ALU 900 includes a combinatory circuitry adapted to perform the aforementioned arithmetic logic operations on the input data DTI1 and DTI2. In particular, a Logic Operation Block 950, adapted to execute logic operations, and an Arithmetic Operation Block 960, adapted to execute arithmetic operations are provided.

Also in this case, the thick arrow lines 930, 940 and 970 represent 32-bit input/output signal lines. In particular, the lines 930 and 940 represent the input data and the line 970 represents the output data. Moreover, the line 920 represents a number of input signals which depending on their suitable combinations, allows to the ALU performing a selected one among the available operations. In the example at issue, the line 920 includes a set of S signal lines adapted to select one available operation among the $2^S$ available operations by the ALU. In the example at issue, the line 920 includes three signal lines (i.e., corresponding to the bit-size of the field OPC). The ALU outputs data DTO through the output line 970. In the practice, the structure of the ALU is slightly more complex, in order to be capable of processing vectors of complex numbers, but still complying with the general schema of FIG. 9.

The BPE 180 may include two or more ALU operation-execution units of the type just described. This would allow reducing the latency of the overall processing. In fact, with just one ALU, it would not be possible to execute concurrently instructions involving arithmetic operations, and even the implementation of macro-instructions might be strongly compromised.

It should be noted that thanks to the ability to concurrently execute two or more operations, the BPE supports throughputs comparable to that of traditional ASIC designs. Moreover, the added flexibility does not impair the circuit complexity, which remains reasonably low.

Moreover, the capability of the BPE of supporting multiple standards reduces the costs with respect to case wherein separate circuitry is used for each standard.

Naturally, in order to satisfy local and specific requirements, a person skilled in the art may apply to the solution described above many modifications and alterations.

For example, although in the preceding description reference has been made to specific operation-execution units PUi which are adapted for performing the FFT, the inverse FFT and arithmetic and logic operations, the operations performed by the operation-execution units may be various. For example, an operation-execution unit might be provided able to perform a Hadamard transform, or to generate portions of the UMTS cell-specific scrambling code.

In addition, the operation-execution units PUi may be designed for performing any desired operation, not necessarily only those required in the applications of wireless communications, thus resulting in a great application flexibility of the disclosed BPE architecture. For example, the operation-execution units may be properly designed so that the BPE may be used in digital video processing applications.

It is pointed out that the instruction format described in the foregoing is merely exemplary, and several other formats can be used.

Likewise, different ways for routing data between the different units of the BPE may be devised.

In addition, it is also possible to use a different communication protocol between the programmable control unit and the communication master.

Referring to FIG. 1, the processing unit 120 may be incorporated within an electronic device such as the mobile terminal 100, which may be incorporated with an electronic system such as a system including a computer and a wireless router with which the computer communicates.

From the foregoing it will be appreciated that, although specific embodiments of the invention have been described herein for purposes of illustration, various modifications may be made without deviating from the spirit and scope of the invention.

What is claimed is:

1. A data processor unit, including at least two operation-execution units, each one adapted to: receive input data; perform a respective operation on the input data; and outputting output data resulting from said input data after applying said operation, the data processor unit further including: a data storage unit including at least two individually-accessible memory devices adapted to store data; a programmable controller adapted to be programmed so as to execute a selected program; a first data routing circuit arrangement adapted to receive data from the at least two memory devices, from the programmable controller and from a second data routing circuit arrangement, and for selectively routing selected ones among the received data to the input of the operation-execution units; said second data routing circuit arrangement being adapted to receive the output data outputted by the operation-execution units and to selectively route the output data to the at least two memory devices, to the programmable controller, and to the first data routing circuit arrangement; wherein the programmable controller is operatively coupled to the at least two operation-execution units, to the first and second data routing circuit arrangements, and to the at least two memory devices for controlling the operation thereof.

2. The data processor unit according to claim 1, wherein the programmable controller is adapted to concurrently activate at least two among the at least two operation-execution units so as to cause a concurrent execution of at least two operations on respective input data.

3. The data processor unit according to claim 1, wherein the programmable controller is adapted to control the first and second data routing circuit arrangements so as to cause a direct supply of the output data outputted by at least one of the at least two operation-execution units to the input of at least another one of the at least two operation-execution units by directly routing said output data from the output of said one of the at least two operation-execution units to the input of said another one of the at least two operation-execution units, through the first and second data routing circuit arrangements.

4. The data processor unit according to claim 3, wherein the programmable controller includes: an internal operation-execution unit internal to the programmable controller; and an instruction decoding unit adapted to decode instructions of the program to be executed by the programmable controller, wherein said instruction decoding unit is adapted to determine whether an instruction of the program includes an operation to be directly executed by the internal execution unit internal to the programmable controller without invoking the operation-execution units, or the instruction includes an operation for the execution of which at least one of the at least two operation-execution units is to be activated.

5. The data processor unit according to claim 4, in which said instructions include an operation type identifier that includes an operation identifier and an operation-execution unit identifier, said instruction decoding unit being adapted to exploit the operation identifier and the operation-execution unit identifier for determining whether the instruction includes an operation to be directly executed by the internal execution unit, or for determining the operation-execution unit to be activated for the execution of the operation.

6. The data processor unit according to claim 5, in which said instruction includes a linked instruction identifier, the instruction decoding unit being adapted to exploit the linked instruction identifier for determining that the instruction is linked to a following instruction, and for causing the programmable controller to perform said directly routing of the output data from the output of one of the at least two operation-execution units executing the operation of the instruction to the input of another one of the at least two operation-execution units that has to execute the operation of the following instruction.

7. The data processor unit according to claim 5, in which said instruction includes a concurrent instruction identifier, the instruction decoding unit being adapted to exploit the concurrent instruction identifier for determining that the instruction includes an operation to be executed concurrently to an operation included in a following instruction.

8. The data processor unit according to claim 5, in which said instruction includes an operand identifier, including an input operand identifier and an output operand identifier, wherein: the input operand identifier is exploited by the programmable controller for determining whether the input data to be fed to the input of the operation-execution unit is to be taken from the at least two memory devices, from the programmable controller, or from the output of at least one of said at least two operation-execution units, and for accordingly driving the first and second data routing circuit arrangements; and the output operand identifier is exploited by the programmable controller for determining whether the output data outputted by the operation-execution unit are to be routed to one of the at least two memory devices, to the programmable controller, or to the input of at least one of said at least two operation-execution units, and for accordingly driving the first and second data routing circuit arrangements.

9. The data processor unit according to claim 5, wherein the at least two operation-execution units are adapted to execute operations on data formed by vectors of complex numbers.

10. The data processor unit according to claim 9, in which said instruction includes a pointer to register of the programmable controller, said register being adapted to store an indication of size of the input data for the at least two operation-execution units, said size indication being adapted to specify whether the input data are a scalar or a vector of complex numbers.

11. The data processor unit according to claim 2, in which the programmable controller is adapted to configure the at least two operation-execution units, the first and the second data routing circuit arrangement before concurrently activation thereof for the concurrent execution of the at least two operations.

12. The data processor unit according to claim 10, in which the first data routing circuit arrangement includes at least two data router, each data router being coupled to a respective one of the at least two operation-execution units, the data processor unit further comprising: a set of shared configuration signal lines for carrying configuration data from the programmable controller-unit to the at least two data routers, and a set of selection signals for selecting one among the at least two data router to be configured by said configuration data.

13. The data processor unit according to claim 1, wherein each one of the at least two operation-execution units is adapted to perform at least one operation selected from the set consisting of a Fast Fourier transform operation, an inverse Fast Fourier transform operation, a Hadamard transform operation, arithmetic operations, logic operations, and a code generation operation for generating codes adapted to be used as spreading codes in a CDMA communications system.

14. The data processor unit according to claim 1, further comprising a program memory adapted to store programs to be executed by the programmable controller, said program memory being adapted to store at least two programs to be alternatively executed by the programmable controller.

15. The data processor unit according to claim 14, in which said program memory includes at least two program memory devices, each one adapted to store a respective one of said at least two programs.

16. A processor, comprising:
operation-execution units each operable to process respective data in a pipelined manner;
a memory;
a first router operable to couple data from the operation-execution units to the memory; and
a second router operable to route data from the memory and from the first router to the operation-execution units.

17. The processor of claim 16 wherein the memory comprises a number of memory banks equal to the number of operation-execution units.

18. The processor of claim 16 wherein the second router comprises a number of routing paths equal to the number of operation-execution units.

19. The processor of claim 16 wherein: a first one of the operation-execution units is operable to provide first data to the first router; the first router is operable to couple the first data from the first operation-execution unit to the second router; and the second router is operable to couple the first data from the first router to a second one of the operation-execution units.

20. The processor of claim 16 wherein: a first one of the operation-execution units is operable to provide first data to the first router; the first router is operable to couple the first data from the first operation-execution unit to the second router; and the second router is operable to couple the first data from the first router to the first operation-execution unit.

21. The processor of claim 16, further comprising a controller coupled to an operable to control the operations of the operation-execution units, the memory, the first router, and the second router.

22. An electronic device, comprising: a processor, comprising, operation-execution units each operable to process respective data in a pipelined manner, a memory, a first router operable to couple data from the operation-execution units to the memory, and a second router operable to route data from the memory and from the first router to the operation-execution units.

23. An electronic system, comprising:
an electronic device having a processor that comprises, operation-execution units each operable to process respective data in a pipelined manner, a memory, a first router operable to couple data from the operation-execution units to the memory, and a second router operable to route data from the memory and from the first router to the operation-execution units.

24. A method, comprising:
processing input data with a first operation-execution unit in a pipelined manner to generate output data;
coupling the output data to a second operation-execution unit via first and second routers;
processing the output data with the second operation-execution unit in a pipelined manner, and
wherein coupling the output data comprises:
coupling the output data from the first operation-execution unit to a memory with the first router; and
coupling the output data from the memory to the second operation-execution unit with the second router.

25. The method of claim 24, further comprising: executing software instructions with a controller; and controlling the first and second operation-execution units and the first and second routers with the controller in response to the executed software instructions.

* * * * *

UNITED STATES PATENT AND TRADEMARK OFFICE
CERTIFICATE OF CORRECTION

| | |
|---|---|
| PATENT NO. | : 7,668,193 B2 |
| APPLICATION NO. | : 11/219358 |
| DATED | : February 23, 2010 |
| INVENTOR(S) | : Daniele Lo Iacono |

Page 1 of 1

It is certified that error appears in the above-identified patent and that said Letters Patent is hereby corrected as shown below:

- In Claim 11, Column 21, Lines 11 and 12 of the patent, please change the text "concurrently activation" to -- concurrent activation --.

- In Claim 12, Column 21, Line 16 of the patent, please change the text "data router," to -- data routers, --.

- In Claim 12, Column 21, Line 22 of the patent, please change the text "data router to" to -- data routers to --.

- In Claim 21, Column 22, Line 15 of the patent, please change the text "comprising a controller coupled to an operable to control the operations" to -- comprising a controller operable to control the operations --.

Signed and Sealed this

Eighth Day of June, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,668,193 B2 | Page 1 of 1 |
| APPLICATION NO. | : 11/219358 | |
| DATED | : February 23, 2010 | |
| INVENTOR(S) | : Daniele Lo Iacono | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1159 days.

Signed and Sealed this

Seventh Day of December, 2010

David J. Kappos
*Director of the United States Patent and Trademark Office*